United States Patent
Gysling et al.

(10) Patent No.: US 10,233,778 B2
(45) Date of Patent: Mar. 19, 2019

(54) CIRCUMFERENTIAL PLENUM FOR OIL DAMPER

(71) Applicant: United Technologies Corporation, Farmington, CT (US)

(72) Inventors: Daniel L. Gysling, South Glastonbury, CT (US); Gregory M. Savela, Stuart, FL (US); John M. Feiereisen, South Windsor, CT (US); Robert J. Morris, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 474 days.

(21) Appl. No.: 15/173,065

(22) Filed: Jun. 3, 2016

(65) Prior Publication Data
US 2017/0350273 A1 Dec. 7, 2017

(51) Int. Cl.
*F02C 7/06* (2006.01)
*F01D 25/16* (2006.01)
*F16C 19/06* (2006.01)
*F16C 27/04* (2006.01)

(52) U.S. Cl.
CPC .............. *F01D 25/164* (2013.01); *F02C 7/06* (2013.01); *F16C 19/06* (2013.01); *F16C 27/045* (2013.01); *F05D 2220/32* (2013.01); *F05D 2240/50* (2013.01); *F05D 2240/581* (2013.01); *F05D 2240/60* (2013.01); *F05D 2260/96* (2013.01); *F16C 2360/23* (2013.01)

(58) Field of Classification Search
CPC .. F16C 27/045; F16C 35/078; F16C 2360/23; F01D 25/164; F02C 7/06; F05D 2240/50; F05D 2240/581; F05D 2240/60; F05D 2260/96
See application file for complete search history.

(56) References Cited

U.S. PATENT DOCUMENTS

| | | | | |
|---|---|---|---|---|
| 3,456,992 A * | 7/1969 | Kulina | ................. | F16C 27/045 384/100 |
| 5,067,825 A | 11/1991 | Vance | | |
| 5,344,239 A * | 9/1994 | Stallone | ................ | F01D 25/164 384/99 |
| 6,135,639 A * | 10/2000 | Dede | ..................... | F16C 27/045 384/581 |
| 7,329,048 B2 * | 2/2008 | Klusman | ............... | F01D 25/125 384/99 |
| 7,648,278 B2 * | 1/2010 | Stout | ...................... | F16C 27/04 384/535 |
| 2004/0022463 A1 | 2/2004 | Dusserre-Telmon | | |

FOREIGN PATENT DOCUMENTS

DE 102010035665 3/2012
FR 2965858 4/2012

OTHER PUBLICATIONS

EP Search Report dated Oct. 16, 2017 in EP Application No. 171742117.7.

* cited by examiner

Primary Examiner — James Pilkington

(74) Attorney, Agent, or Firm — Snell & Wilmer, L.L.P.

(57) ABSTRACT

A bearing assembly is provided. The bearing assembly includes an inner race configured to couple to a shaft, an outer race disposed around the inner race, and a housing disposed around the outer race. The housing and the outer race define an annulus and a buffer region, and the buffer region defines an axial boundary of the annulus.

18 Claims, 6 Drawing Sheets

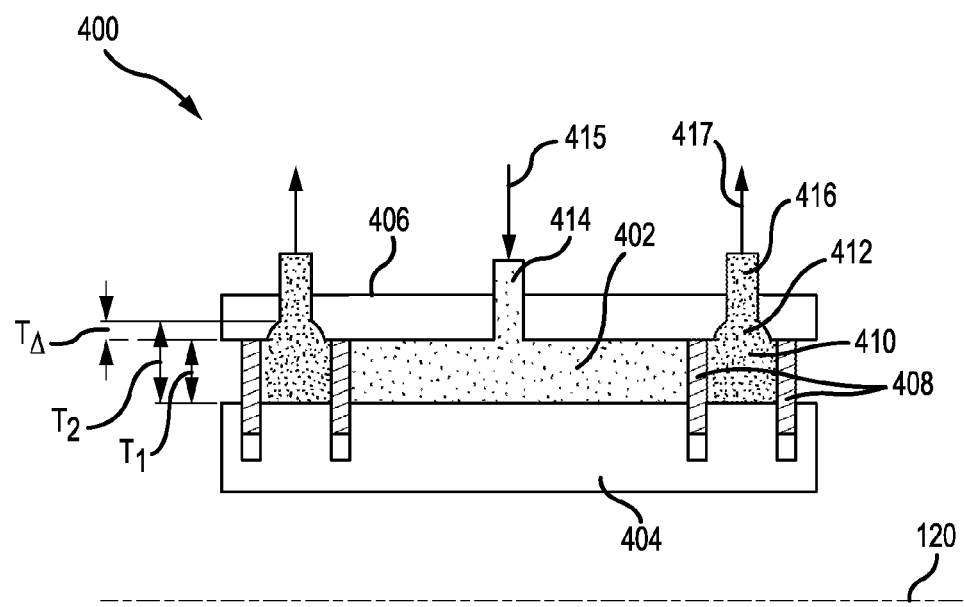
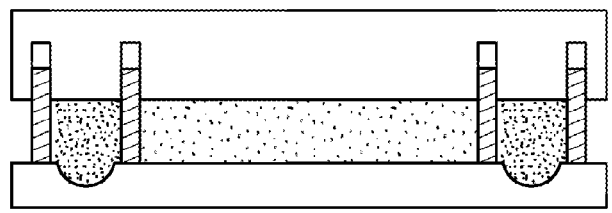
FIG.4

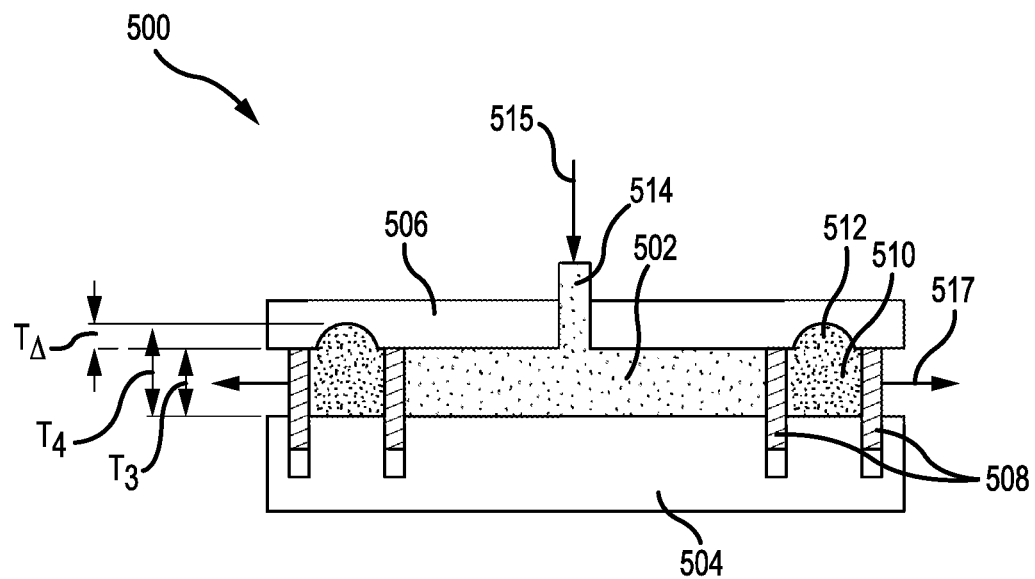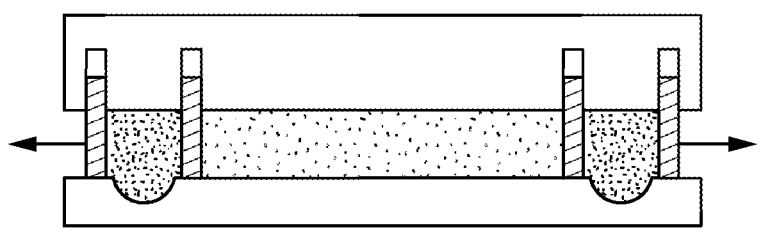
FIG.5

CIRCUMFERENTIAL PLENUM FOR OIL DAMPER

FIELD

The disclosure relates generally to gas turbine engines, and more particularly to rotor dynamic damping devices within gas turbine engine bearing compartments.

BACKGROUND

Gas turbine engines typically comprise bearings which support rotating shafts. The bearings may comprise an inner race which rotates with the shaft, and a plurality of rollers between the inner race and an outer race, which does not rotate. The shaft may whirl and deflect from the engine centerline. Film dampers may be used to damp the whirling.

In a film damper, a thin annulus of oil is typically retained between the outer race and the bearing housing. Oil may be fed into the annulus to form the squeeze-film damper which damps whirling of the shaft. However, under certain conditions, the squeeze-film damper may degrade in its ability to damp rotor motion.

Bearing compartments in gas turbine engines are typically surrounded by a fluid medium (e.g., air). The fluid medium may back-flow from the compartment into the oil film region in response to pressure differentials occurring due to the whirl of a rotating member. If the oil in the damper becomes mixed with the fluid medium, then the damping ability of the damper may be compromised.

SUMMARY

A bearing assembly is provided. The bearing assembly includes an inner race configured to couple to a shaft, an outer race disposed around the inner race, and a housing disposed around the outer race. The housing and the outer race define an annulus and a buffer region, and the buffer region defines an axial boundary of the annulus.

In various embodiments, a first seal may be disposed between the outer race and the housing with the first seal defining a boundary between the annulus and the buffer region. A second seal may be disposed between the outer race and the housing to define a boundary between the buffer region and an atmosphere. The first seal may include at least one of a piston seal or an O-ring seal. The effective radial thickness and axial length of the buffer region, defining an effective cross-sectional area of the buffer region, is set to be sufficiently large to ensure that the pressure field within the buffer region remains sufficiently high to prevent back flow of air from the compartment into the buffer region. The greater the effective cross-sectional area of the buffer region, the more circumferentially uniform the pressure in the buffer region remains. If the pressure in the buffer region remains above the compartment pressure, back flow of air from the compartment is eliminated. A radial thickness of the buffer region may be greater than a radial thickness of the annulus. An oil outlet passage may be defined in the housing and extend radially from the buffer region. A channel may be formed in at least one of the housing or the outer race and configured to increase a cross-sectional area of the buffer region.

A squeeze-film damper is also provided. The squeeze-film damper may include an outer race having an annular geometry, a housing disposed about the outer race, and a first seal and a second seal between the outer race and the housing. The housing, the outer race, the first seal and the second seal may define a thin-film region. A third seal is disposed proximate the second seal to define a buffer region between the second seal and the third seal.

In various embodiments, the third seal may comprise at least one of an O-ring seal, a face seal, or a piston seal. The second seal may also comprise at least one of a piston seal or an O-ring seal. The effective cross-sectional area of the buffer region should be sufficiently large to ensure that the pressure within the buffer region remains essentially circumferentially uniform and above the compartment pressure. The radial thickness of the buffer region may be greater than a radial thickness of the thin-film region. A radial thickness of the buffer region may also be greater than or equal to 50 mils. An oil outlet passage may be defined in the housing and may extend radially from the buffer region. A channel may be formed in at least one of the housing or the outer race to increase a cross-sectional area of the buffer region.

A gas turbine engine is also provided. The gas turbine engine may include a shaft, an inner bearing race coupled to the shaft, and an outer bearing race surrounding the inner bearing race. The shaft and the inner bearing race may be configured to rotate within the outer bearing race. A housing may surround the outer bearing race, and the outer bearing race may be configured to whirl within the housing. A thin-film region and a buffer region may be defined between the outer bearing race and the housing.

In various embodiments, a first seal may be disposed between the outer bearing race and the housing with the first seal defining a boundary between the thin-film region and the buffer region. The first seal may be an O-ring seal or a piston seal. A second seal may be disposed between the outer bearing race and the housing to define a boundary between the buffer region and an atmosphere. The effective cross-sectional area of the buffer region should be sufficiently large to ensure that the pressure within the buffer region remains essentially circumferentially uniform and above the compartment pressure. A radial thickness of the buffer region may be greater than a radial thickness of the thin-film region. A channel may be formed in at least one of the housing or the outer bearing race, with the channel configured to increase a cross-sectional area of the buffer region.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 4 illustrates a cross-sectional view of a thin-film oil damper having a circumferential plenum with an exit passage to buffer the damper from the atmosphere around the damper, in accordance with various embodiments;

FIG. 5 illustrates a cross-sectional view of a thin-film oil damper having a circumferential plenum to buffer the damper from the atmosphere around the damper, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates, in various embodiments, to squeeze-film dampers having an oil-filled buffer region between the damper film and the surrounding atmosphere. The oil-filled buffer region tends to prevent air or other atmospheric gasses from entering the thin film of oil that provides the damping. The buffer region may be formed by seals and may have a radial thickness greater than the radial thickness of the thin-film, as described in greater detail below in FIGS. 4, 5, and 6. Phrases similar to "buffer region," "buffer plenum," and "exit plenum" are also used herein interchangeably.

Figure 1:
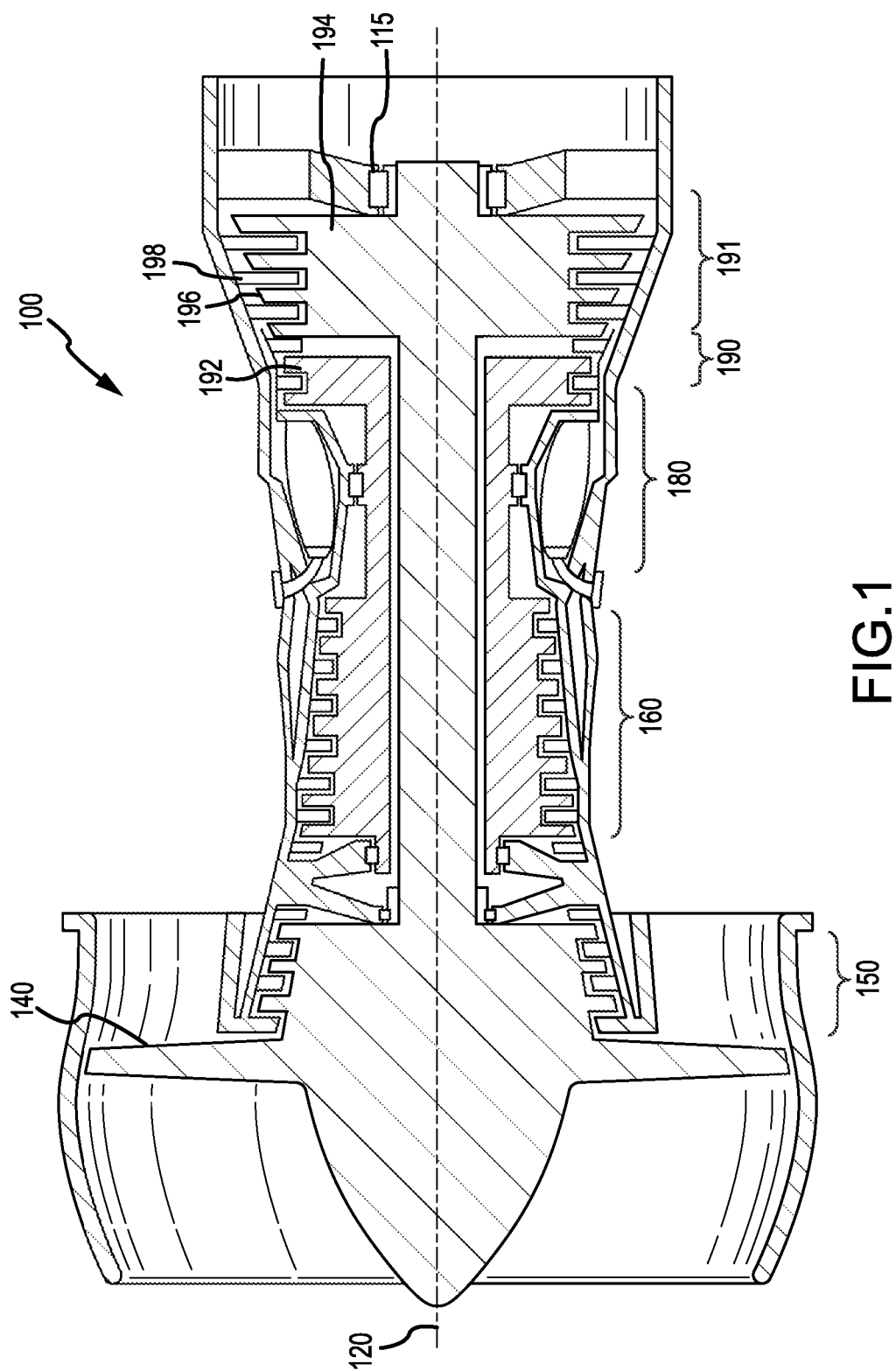
FIG. 1 illustrates an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about engine centerline 120, which may also be referred to as axis of rotation 120. Gas turbine engine 100 may comprise a fan 140, compressor sections 150 and 160, a combustion section 180 including a combustor, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the combustor and turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of rotating machinery, turbomachinery, and pumps, including turbofan gas turbine engines and turbojet engines, for all types of applications. This may also extend when used in combination with other bearing types in said applications including journal type bearings.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
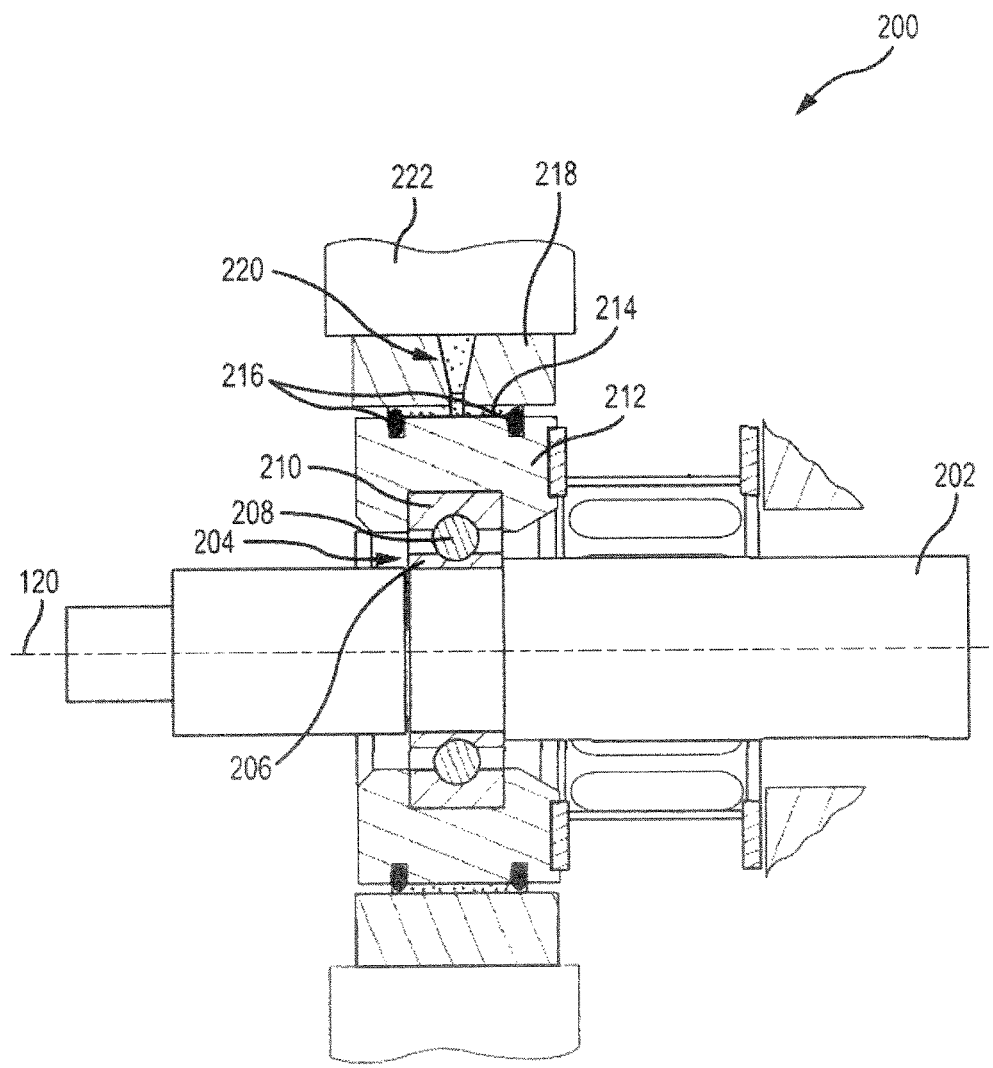
FIG. 2 illustrates a bearing assembly configured to dampen whirl of a rotating shaft, in accordance with various embodiments.

With reference to FIG. 2, an exemplary bearing assembly 200 with a film damper is shown in cross section, in accordance with various embodiments. Bearing assembly 200 may include a shaft 202 configured to rotate about engine centerline 120. Although an engine is used for exemplary purposes, film dampers of the present disclosure may be used in various embodiments where damping is desired. Shaft 202 may engage inner race 206 of bearing 204, which also rotates about engine centerline 120. Bearing 204 be defined by inner race 206, outer race 210, and ball bearings 208 disposed between outer race 210 and inner race 206. Outer race 210 may be rotationally stationary about engine centerline 120. In that regard, inner race 206 rotates while outer race 210 remains stationary.

In various embodiments, bearing support structure 212 may be coupled to outer race 210 and be configured to engage seal 216. Seal 216 may also be configured to engage housing 218. A film damper region 214 may be defined between bearing support structure 212 and housing 218 with seals 216 defining the axial boundaries of film damper region 214. Film damper region 214 may be configured to retain a damping fluid such as, for example, oil. Oil may be delivered through passage 220 into film damper region 214. Static structure 222 may be disposed radially outward from bearing assembly 200 and configured to retain bearing assembly 200.

Figure 3:
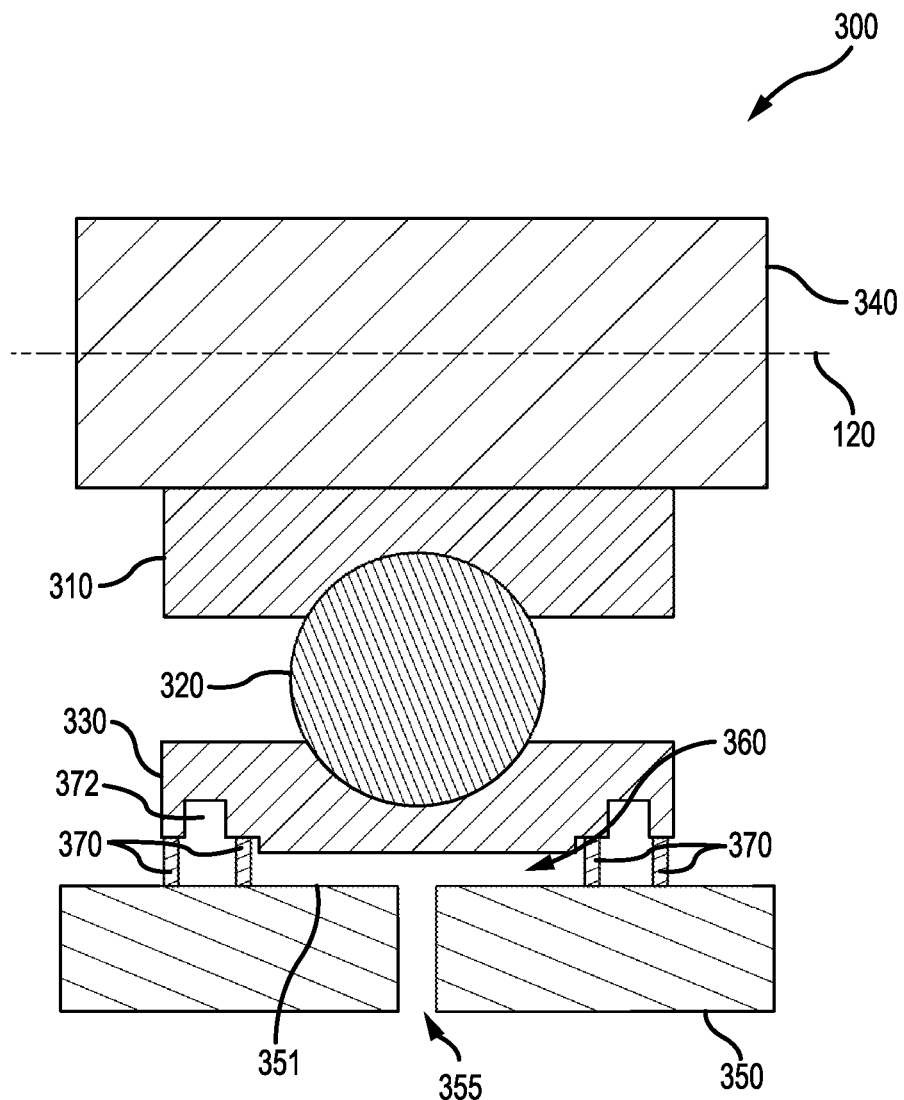
FIG. 3 illustrates cross-sectional view of a bearing assembly having a squeeze-film damper, in accordance with various embodiments.

Referring to FIG. 3, a cross-section view of a bearing 300 is illustrated according to various embodiments. Bearing 300 may comprise an inner race 310, a roller 320, and an outer race 330. Inner race 310 may be coupled to a shaft 340 which rotates about engine centerline 120. Inner race 310 may rotate with shaft 340. Outer race 330 does not rotate with respect to inner race 310. Roller 320 may rotate and decrease friction between inner race 310 and outer race 330 as inner race 310 rotates relative to outer race 330. Bearing 300 may be located within a housing 350.

In various embodiments, housing 350 and outer race 330 may form an annulus 360 around outer race 330 and between outer race 330 and housing 350. Housing 350 define film damper 351, as described in greater detail below with reference to FIGS. 4, 5, and 6. Annulus 360 may be at least partially sealed by seals 370. Oil may be supplied to annulus 360 through an oil supply hole 355 in housing 350. The oil may absorb heat from outer race 330. A portion of the oil, heated by the shearing of the oil in annulus 360, may leak by seals 370, and additional, cooler oil may be supplied to annulus 360 through oil supply hole 355. Buffer region 372 may be defined in outer race 330 to retain oil and prevent air from leaking into annulus 360. Seals 370 may be disposed on either side of buffer region 372 to retain oil within buffer region 372.

With reference to FIG. 4, squeeze-film damper 400 of a bearing assembly is shown, in accordance with various embodiments. Squeeze-film damper 400 may be configured to damp periodic deflection relative to axis of rotation 120. Squeeze-film damper 400 may include static bearing structure 404 (e.g., bearing support structure 212 of FIG. 2 or outer race 330 of FIG. 3). Static bearing structure 404 and housing 406 may define thin-film region 402. Thin-film region 402 may be configured to retain a thin layer of oil to damp whirring. Thin-film region 402 may thus be an annulus formed between housing 406 and static bearing structure 404. The axial boundaries of thin-film region 402 may be defined by seals 408 and buffer region 410. Seals 408 may be piston seals or O-ring seals, for example, to provide circumferential sealing at the axial boundary of thin-film region 402. Oil inlet 414 defined in housing 406 may provide inflow 415 of oil pressurized in a radially inward direction.

In various embodiments, a buffer region 410 may be proximate thin-film region 402 in an axial direction. A seal 408 may define the boundary between thin-film region 402 and buffer region 410. Buffer region 410 may include channel 412 formed in housing 406. Channel 412 may be configured to increase the radial thickness of buffer region 410 and/or a cross-sectional area of buffer region 410. A seal 408 may define the boundary between buffer region 410 and the surrounding atmosphere.

In various embodiments, an oil outlet 416 may extend radially from buffer region 410 and/or channel 412. Inflow 415 of oil may enter thin-film region 402 and flow across seal 408 defining the boundary between buffer region 410 and thin-film region 402. Outflow 417 of oil may flow out buffer region 410 in a radially outward direction. The pressure differential between inflow 415 and outflow 417 may tend to move oil from inflow 415 to outflow 417 and limit the reversal of oil flow.

In various embodiments, thin-film region 402 may have a radial thickness $T_1$. Radial thickness $T_1$ of thin-film region 402 may be approximately 15 mils (0.38 mm). Radial thickness $T_1$ of thin-film region 402 may also range from 5 mils (0.13 mm) to 25 mils (0.64 mm), or from 10 mils (0.25 mm) to 20 mils (0.51 mm). Buffer region 410 may have a radial thickness $T_2$. Radial thickness $T_2$ of buffer region 410 may be greater than radial thickness $T_1$ of thin-film region 402. For example, radial thickness $T_2$ of buffer region 410 may be at least twice the radial thickness $T_1$ of thin-film region 402. For example, radial thickness $T_2$ of buffer region 410 may be 100 mils (2.5 mm). Radial thickness $T_2$ of buffer region 410 may also range from 30 mils (0.76 mm) to 500 mils (12.7 mm), or from 70 mils (1.8 mm) to 400 mils (10.2 mm), or from 75 mils (1.9 mm) to 250 mils (6.35 mm). The radial thickness $T_2$ of buffer region 410 may be selected to provide an oil reservoir sufficient to restrict air bleeding across seal 408 without impeding the damping provided by the oil retained in thin-film region 402. The radial difference $T_\Delta$ between $T_2$ and $T_1$ should thus be positive (i.e., $T_2-T_1>0$).

In the event of a local low pressure region in thin-film region 402, oil may leak into thin-film region 402 from buffer region 410. Thus, squeeze-film damper 400 may prevent air from leaking into thin-film region 402 from the surrounding atmosphere.

With reference to FIG. 5, squeeze-film damper 500 of a bearing assembly is shown, in accordance with various embodiments. Squeeze-film damper 500 may be similar to squeeze-film damper 400 of FIG. 4. Squeeze-film damper 500 may include static bearing structure. Static bearing structure 504 and housing 506 may define thin-film region 502. Thin-film region 502 may be configured to retain a thin layer of oil to damp whirring. Thin-film region 502 may thus be an annulus formed between housing 506 and static bearing structure 504. The axial boundaries of thin-film region 502 may be defined by seals 508 and buffer region 510. Oil inlet 514 defined in housing 506 may provide an inflow 515 of oil pressurized in a radially inward direction.

In various embodiments, a buffer region 510 may be proximate thin-film region 502 in an axial direction. Buffer region 510 of squeeze-film damper 500 may be a pressurized exit plenum for oil. Buffer region 510 may reduce the likelihood of the fluid within the thin-film region to cavitate. A seal 508 may define the boundary between thin-film region 502 and buffer region 510. Buffer region 510 may include channel 512 formed in housing 506. Channel 512 may be configured to increase the radial thickness of buffer region 510 and/or a cross-sectional area of buffer region 510. The effective radial thickness and axial length of the buffer region, defining an effective cross-sectional area of the buffer region, is set to be sufficiently large to ensure that the pressure field within the buffer region remains sufficiently high to prevent back flow of air from the compartment into the buffer region. The greater the effective cross-sectional area of the buffer region, the more circumferentially uniform the pressure in the buffer region remains. If the pressure in the buffer region remains above the compartment pressure, back flow of air from the compartment is eliminated. A radial thickness of the buffer region may thus be greater than the radial thickness of the buffer region.

A seal 508 may define the boundary between buffer region 510 and the surrounding atmosphere. Inflow 515 oil may enter thin-film region 502 and flow across seal 508 defining the boundary between buffer region 510 and thin-film region 502. Outflow 517 of oil may flow out of buffer region 510 and across seal 508 away from oil inlet 514 in an axial direction. The pressure differential between inflow 515 and outflow 517 may tend to move oil from inflow to outflow and limit the reversal of oil flow.

In various embodiments, thin-film region 502 may have a radial thickness $T_3$. Radial thickness $T_3$ of thin-film region 502 may be approximately 15 mils (0.38 mm). Radial thickness $T_3$ of thin-film region 502 may also range from 5 mils (0.13 mm) to 25 mils (0.64 mm). Buffer region 510 may have a radial thickness $T_4$. Radial thickness $T_4$ of buffer region 510 may be greater than radial thickness $T_3$ of thin-film region 502. For example, radial thickness $T_4$ of buffer region 510 may be at least twice the radial thickness $T_3$ of thin-film region 502. For example, radial thickness $T_4$ of buffer region 510 may be 100 mils (2.5 mm). Radial thickness $T_4$ of buffer region 510 may also range from 30 mils (0.76 mm) to 500 mils (12.7 mm). The radial thickness $T_4$ of buffer region 510 may be selected to provide an oil reservoir sufficient to restrict air bleeding across seal 508 without impeding the damping provided by the oil retained in thin-film region 502. The radial difference $T_\Delta$ between $T_4$ and $T_3$ should thus be positive (i.e., $T_4-T_3>0$).

The pressure in the exit plenum (i.e., buffer region 510) is controlled by the ratio of leakage area across the seals 508 defining the boundaries of buffer region 510. In the event of a local low pressure region in thin-film region 502, oil may leak into thin-film region 502 from buffer region 510. Thus, thin film damper 500 may prevent air from leaking into thin-film region 502 from the surrounding atmosphere.

Figure 6:
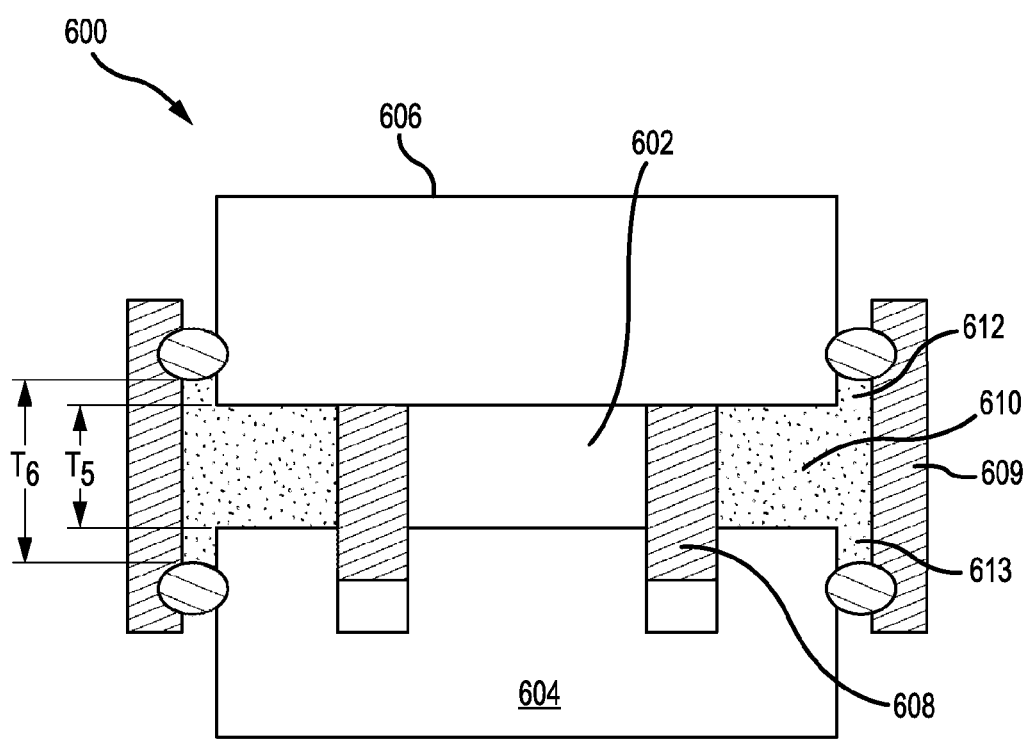
FIG. 6 illustrates a cross-sectional view of a thin-film oil damper having side seals to create a buffer between the damper and the atmosphere around the damper.

With reference to FIG. 6, squeeze-film damper 600 of a bearing assembly 200 is shown, in accordance with various embodiments. Squeeze-film damper 600 is similar to squeeze-film damper 500 of FIG. 5 and squeeze-film damper 400 of FIG. 4. Squeeze-film damper 600 may include static bearing structure 604. Static bearing structure 604 and housing 606 may define thin-film region 602. Thin-film region 602 may be configured to retain a thin layer of oil to damp whirring. Thin-film region 602 may thus be an annulus formed between housing 606 and static bearing structure 604. The axial boundaries of thin-film region 602 may be defined by seals 608 and buffer region 610. Seals 608 may be, for example, O-ring seals or piston seals to provide circumferential sealing at the axial boundary of thin-film region 602.

In various embodiments, face seal 609 may form the boundary between buffer region 610 and the surrounding atmosphere (e.g., air). Face seal 609 may define radial extension region 612 and radial extension region 613. The radial extension regions may have varying radial thickness or symmetric radial thickness.

In various embodiments, thin-film region 602 may have a radial thickness $T_5$. Radial thickness $T_5$ of thin-film region 602 may be approximately 15 mils (0.38 mm). Radial thickness $T_5$ of thin-film region 602 may also range from 5 mils (0.13 mm) to 25 mils (0.64 mm), or from 10 mils (0.25 mm) to 20 mils (0.51 mm). Buffer region 610 may have a radial thickness $T_6$. The radial extension regions of buffer region 610 may cause buffer region 610 to have radial thickness $T_6$ greater than the radial thickness $T_5$ of thin-film region 602. For example, radial thickness $T_6$ of buffer region 610 may be at least twice the radial thickness $T_5$ of thin-film region 602. For example, radial thickness $T_6$ of buffer region 610 may be 100 mils (2.5 mm). Radial thickness $T_6$ of buffer region 610 may also range from 30 mils (0.76 mm) to 600 mils (12.7 mm), or from 70 mils (1.8 mm) to 400 mils (10.2 mm), or from 75 mils (1.9 mm) to 250 mils (6.35 mm). The radial thickness $T_6$ of buffer region 610 may be selected to provide an oil reservoir sufficient to restrict air bleeding across seal 608 without impeding the damping provided by the oil retained in thin-film region 602. The radial difference between $T_6$ and $T_5$ should thus be positive (i.e., $T_6-T_5>0$).

The squeeze-film dampers with buffer regions may tend to prevent air or other surrounding atmospheric fluid from leaking into the thin-film region. The buffer region may have a radial thickness great enough to provide a continuous oil reservoir at the seal defining the boundary between the buffer region and the thin-film region. The squeeze-film damper may also be pressurized so that there is a pressure drop from thin-film region to buffer region, thereby tending to force oil and any other fluid out the thin-film region and into the buffer region.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bearing assembly for a shaft configured to rotate about an axis, comprising:
    an inner race configured to couple to the shaft;
    an outer race disposed around the inner race;
    a housing disposed around the outer race, wherein the housing and the outer race define an annulus and a buffer region, wherein the buffer region defines an axial boundary of the annulus; and
    an inlet and an outlet defined in the housing, the outlet connected to a channel defined in the housing, the channel being positioned radially outward of the buffer region and also connected to the buffer region, and the inlet connected to the annulus.

2. The bearing assembly of claim 1, further comprising a first seal disposed between the outer race and the housing, wherein the first seal defines a boundary between the annulus and the buffer region.

3. The bearing assembly of claim 2, further comprising a second seal disposed between the outer race and the housing, wherein the second seal defines a boundary between the buffer region and an atmosphere.

4. The bearing assembly of claim 3, wherein the first seal comprises at least one of a piston seal or an O-ring seal.

5. The bearing assembly of claim 3, wherein a radial thickness of the buffer region is greater than a radial thickness of the annulus.

6. The bearing assembly of claim 3, wherein the channel is configured to increase a cross-sectional area of the buffer region.

7. A squeeze-film damper comprising:

an outer race having an annular geometry;

a housing disposed about the outer race;

a first seal and a second seal between the outer race and the housing, wherein the housing, the outer race, the first seal and the second seal define a thin-film region;

a third seal proximate the second seal and defining a buffer region between the second seal and the third seal; and an inlet and an outlet defined in the housing, the outlet connected to a channel defined in the housing, the channel being positioned radially outward of the buffer region and also connected to the buffer region, and the inlet connected to the thin-film region.

8. The squeeze-film damper of claim 7, wherein the third seal comprises at least one of an O-ring seal, a face seal, or a piston seal.

9. The squeeze-film damper of claim 7, wherein the second seal comprises at least one of a piston seal or an O-ring seal.

10. The squeeze-film damper of claim 7, wherein a radial thickness of the buffer region is at least twice a radial thickness of the thin-film region.

11. The squeeze-film damper of claim 7, wherein a radial thickness of the buffer region is greater than a radial thickness of the thin-film region.

12. The squeeze-film damper of claim 7, wherein the channel is configured to increase a cross-sectional area of the buffer region.

13. A gas turbine engine comprising:

a shaft;

an inner bearing race coupled to the shaft;

an outer bearing race surrounding the inner bearing race, wherein the shaft and the inner bearing race are configured to rotate within the outer bearing race;

a housing surrounding the outer bearing race, wherein the outer bearing race is configured to whirl within the housing, wherein a thin-film region and a buffer region are defined between the outer bearing race and the housing; and an inlet and an outlet defined in the housing, the outlet connected to a channel defined in the housing, the channel being positioned radially outward of the buffer region and also connected to the buffer region, and the inlet connected to the thin-film region.

14. The gas turbine engine of claim 13, further comprising a first seal disposed between the outer bearing race and the housing, wherein the first seal defines a boundary between the thin-film region and the buffer region.

15. The gas turbine engine of claim 14, wherein the first seal comprises at least one of an O-ring seal or a piston seal.

16. The gas turbine engine of claim 14, further comprising a second seal disposed between the outer bearing race and the housing, wherein the second seal defines a boundary between the buffer region and an atmosphere.

17. The gas turbine engine of claim 14, wherein a radial thickness of the buffer region is greater than a radial thickness of the thin-film region.

18. The gas turbine engine of claim 14, wherein the channel is configured to increase a cross-sectional area of the buffer region.

* * * * *